US008699387B2

(12) United States Patent
Bourdeaut et al.

(10) Patent No.: US 8,699,387 B2
(45) Date of Patent: Apr. 15, 2014

(54) DEVICE AND CONTROL PROCEDURE FOR FDD AND NON-FDD BANDWIDTH

(75) Inventors: Stanislas Bourdeaut, Velizy (FR); Jérôme Pons, Paris (FR)

(73) Assignees: Alcatel Lucent, Paris (FR); France Telecom, Paris (FR)

( * ) Notice: Subject to any disclaimer, the term of this patent is extended or adjusted under 35 U.S.C. 154(b) by 22 days.

(21) Appl. No.: 12/226,918

(22) PCT Filed: May 2, 2007

(86) PCT No.: PCT/EP2007/054242
§ 371 (c)(1),
(2), (4) Date: Aug. 27, 2009

(87) PCT Pub. No.: WO2007/125124
PCT Pub. Date: Nov. 8, 2007

(65) Prior Publication Data
US 2010/0020731 A1 Jan. 28, 2010

(30) Foreign Application Priority Data
May 2, 2006 (FR) ..................... 06 51561

(51) Int. Cl.
*H04J 1/00* (2006.01)
(52) U.S. Cl.
USPC ............................ 370/281; 370/328; 370/465
(58) Field of Classification Search
USPC ......... 370/276, 277, 278, 280, 281, 282, 294, 370/295, 328, 329, 338, 465
See application file for complete search history.

(56) References Cited

U.S. PATENT DOCUMENTS

| 6,351,458 | B2 * | 2/2002 | Miya et al. ..................... 370/330 |
| 6,611,507 | B1 * | 8/2003 | Hottinen et al. ............... 370/331 |
| 7,133,673 | B2 * | 11/2006 | Zeira et al. ..................... 455/436 |
| 7,224,676 | B2 * | 5/2007 | Uebayashi et al. ........... 370/330 |
| 7,248,567 | B2 * | 7/2007 | Desgagne et al. ............. 370/277 |
| 7,408,900 | B2 * | 8/2008 | Hunkeler ....................... 370/331 |
| 7,586,874 | B2 * | 9/2009 | Rudolf et al. ................. 370/330 |
| 7,668,142 | B2 * | 2/2010 | Ishiguro et al. ............... 370/335 |
| 7,706,308 | B2 * | 4/2010 | Yun et al. ...................... 370/280 |
| 2003/0117995 | A1 * | 6/2003 | Koehn et al. .................. 370/350 |
| 2005/0141450 | A1 * | 6/2005 | Carlton et al. ................ 370/329 |
| 2006/0018279 | A1 | 1/2006 | Agrawal |
| 2007/0121531 | A1 * | 5/2007 | Lee et al. ...................... 370/280 |
| 2007/0224988 | A1 * | 9/2007 | Shaheen ....................... 455/436 |

FOREIGN PATENT DOCUMENTS

| EP | 0975184 A1 | 1/2000 |
| EP | 1207636 A2 | 5/2002 |
| JP | 2001275152 | 10/2001 |
| JP | 2002521988 A | 7/2002 |
| JP | 2006516870 A | 7/2006 |
| WO | WO 2004/028174 | 4/2004 |
| WO | WO 2005/067493 A2 | 7/2005 |

* cited by examiner

*Primary Examiner* — Ricky Ngo
*Assistant Examiner* — Christine Ng
(74) *Attorney, Agent, or Firm* — McKenna Long & Aldridge LLP

(57) ABSTRACT

A device (D) dedicated to control of bandwidth used by a work station (3-*j*) that can be connected to a network allowing the user to access a service that doesn't require feedback, this network being a frequency division duplexing network which accommodates at least one frequency bundle branch block of the first type, dedicated to transmission of data bundles, and a second type district from the first type. This device has i) the capacity to analyze at least signalling information received from the work station on the first type block, and ii) a switchover feature which is activated if the analysis device detects signalling information signalling the availability of a service on a second type frequency block range, to receive second type data stream on the second type frequency block.

8 Claims, 1 Drawing Sheet

DEVICE AND CONTROL PROCEDURE FOR FDD AND NON-FDD BANDWIDTH

This application is a 35 U.S.C. §371 National Stage entry of PCT/EP2007/054242, filed on May 2, 2007, and claims priority to French Application No. FR0651561, filed on May 2, 2006, both of which are hereby incorporated by reference in their entireties.

BACKGROUND OF THE INVENTION

The invention relates to the field of communication networks and more particularly radio communication networks, notably the mobile radio communication networks of the UMTS type.

More precisely, the invention relates to the use of frequency bands by user terminals for the purpose of accessing services that do not require a backward channel such as for example the broadcast services offered by such radio networks.

In this instance, "a service not requiring a backward channel" means any one-way service of the point-to-multipoint or point-to-point type, and notably broadcast services, if necessary of multimedia content, such as for example, and not limitingly, the broadcast service of the MBMS ("Multimedia Broadcast/Multicast Service") type.

Note that the MBMS broadcast service is defined in version 6 (or "release 6") of the 3GPP ("3rd Generation Partnership Project") specifications, which governs the transmission of multimedia data in mobile (or cellular) networks of the UMTS type having a radio access network, for example of the UTRAN ("UMTS Terrestrial Radio Access Network") type or of the UTRAN upgrade type, and in particular in the 3GPP technical specifications TS 25.346 and 23.246 (notably accessible on the 3GPP website at address "www.3gpp.org").

Furthermore, "multimedia content" in this instance means data files, such as for example audio files or video files, or television programs, notably.

As those skilled in the art know, the 3GPP organization recommends two radio access network modes for mobile networks such as the UMTS.

A first mode relates to the radio access networks called FDD ("Frequency Division Duplex") or WCDMA ("Wideband Code Division Multiple Access"), that is to say those which use a frequency duplex in order to transmit data. In this first mode (FDD), the mobile terminal of the user (or the user terminal) transmits data to the radio access network on a frequency dedicated to an uplink, while the radio access network transmits data to the user terminal on another frequency dedicated to a downlink. Therefore, in order to set up, for example, a conventional voice call, the user terminal and the mobile network transmit data on both frequencies simultaneously.

The International Telecommunications Union (ITU) in 1992 allocated specific FDD frequency bands between 1920 MHz and 1980 MHz for uplinks and between 2110 MHz and 2170 MHz for downlinks, for the FDD UMTS networks. These bands are divided into frequency blocks of 5 MHz that are paired between the "uplink" and "downlink" bands.

A second mode, that is described here as an example, relates to radio access networks called TDD ("Time Division Duplex"), that is to say those that use a time duplex in order to transmit data. In this second mode (TDD), the user terminal transmits data to the radio access network on a frequency dedicated to an uplink during a given timeslot, while the radio access network transmits data to the user terminal on the same frequency dedicated to a downlink but on another timeslot. Therefore, in order to establish a conventional communication, the user terminal and the mobile network transmit data on the same frequency "alternately".

The International Telecommunications Union also in 1992 allocated specific TDD frequency bands between 1900 MHz and 1920 MHz and between 2010 MHz and 2025 MHz for the uplinks and downlinks, for the TDD UMTS networks. These bands are divided into frequency blocks of 5 MHz that are not paired.

The UMTS operators that enjoy the allocation of FDD frequency bands exploit the latter to such a point of saturation that it becomes difficult, or even impossible, to use them in order to offer new services such as MBMS without risking interfering with other services that already use them, such as for example the conventional radio communication services. This is all the more true when the broadcast service requires a considerable quantity of radio resources, such as for example in the case of mobile television which requires a minimum bit rate of 256 kbps (kilobits per second) for each television channel for an optimal quality of service level (or a minimum bit rate of 128 kbps for an inferior quality level).

In addition, the FDD frequency bands are usually shared by several operators, so it is yet more difficult for them to offer, each on their own side, to their respective customers services (if necessary broadcast services) which, as indicated above, are large consumers of radio resources.

Furthermore, multimedia data broadcast services, such as MBMS for example, may be used on any type of UMTS radio access network (TDD or FDD). They usually comprise two broadcast modes.

A first broadcast mode called "broadcast" makes it possible to broadcast the same multimedia data in all the cells of a service zone, of the operator's mobile network, associated with these multimedia data. All the UMTS mobile terminals, complying with UMTS version 6 (which introduced MBMS) and being in this service zone, may then receive the broadcast multimedia data.

A second broadcast mode called "multicast" makes it possible to broadcast the same multimedia data in all the cells of a service zone, of the mobile operator's network, associated with these multimedia data. But, unlike the first mode (broadcast), only the UMTS user terminals complying with UMTS version 6 that are in the service zone and have taken out a subscription allowing them to receive such multimedia data may receive the multimedia data that are broadcast.

Consequently, in a given cell of an operator's mobile network, a content may be either not broadcast when this cell does not belong to the service zone associated with the broadcast of the content (multimedia data), or be broadcast to all the user terminals situated in said service zone (in broadcast mode), or else be broadcast only to a portion of the user terminals situated in said service zone (in multicast mode).

When a content (if necessary multimedia) is broadcast in a cell, two situations may arise. The first situation usually corresponds to a situation in which a small number of user terminals receives the content. In this first case, dedicated radio channels of the point-to-point (or PTP) type are set up between the operator's radio access network and each user terminal situated in this cell and concerned with the content. The second situation usually corresponds to a situation in which a high number of user terminals receives the content. In this second situation, a shared radio channel of the point-to-multipoint (or PTM) type is set up between the operator's radio access network and all the user terminals situated in this cell and concerned with the content.

To make it easier to use the shared radio channel of the point-to-multipoint type (the second situation), the user terminals complying with version 6 of the UMTS standard receive only on a downlink the data (in the form of radio signals) that are associated with the MBMS service and that originate from the operator's radio access network. They therefore transmit no data (or no radio signal) associated with the MBMS service on an uplink. The broadcast is then said to have no backward channel. Consequently, when the radio access network is of the FDD type, the FDD frequency band dedicated to the FDD uplinks is not used by the user terminals for the MBMS service, and when the radio access network is of the TDD type, the timeslot dedicated to TDD uplinks is not used by the user terminal for the MBMS service.

To improve the situation, and alleviate the disadvantage of "overuse" of FDD frequency bands, it would be possible to fit the user terminals and the radio access network equipment with hybrid, for example FDD/TDD, transceivers. But that would be costly not only for the equipment makers (manufacturers of radio access networks and/or user terminals) but also for the operators of the mobile networks. Another solution would consist in having a mobile network operator deploy two radio access networks, one operating in FDD mode and the other operating for example in TDD mode, and in proposing that the customers of this operator buy two user terminals, one having a transceiver operating in FDD mode and the other having a transceiver operating in TDD mode so that they can receive the MBMS content. But, this solution is also costly.

No known solution is therefore entirely satisfactory.

The invention makes it possible to improve the situation by proposing to transmit certain data frames of the FDD type on downlinks of a radio access network of the FDD type to user terminals equipped with an FDD transceiver, in other available frequency bands, such as for example in at least a portion of the TDD frequency bands (that is to say at least one block of frequencies of 5 MHz in an exemplary embodiment).

SUMMARY OF THE INVENTION

Accordingly it proposes a device for controlling frequency bands used by a user terminal suitable for being connected to a network making it possible to provide the user with a service that does not require a backward channel, the network being a Frequency Division Duplex (FDD) network, and having at least one set of frequency blocks of a first type, dedicated to the transmission of data frames, and one set of frequency blocks of a second type distinct from the first type, for example TDD. This device comprises means for analyzing at least one item of signaling information received by the user terminal on a frequency block of the first type, and switchover means capable of being activated if the analyzing means detect an item of signaling information signaling the provision of a service on a frequency block of the second type, in order to receive data frames of the first type on the frequency block of the second type.

Therefore, the user terminal may receive the data of the service (if necessary broadcast data) and items of signaling information, transmitted by the radio access network in the form of FDD frames, on the frequency block of the second type.

The means for switching over this device may also be responsible, before the switchover to the frequency block of the second type, for proposing to the user of the terminal to access the service and for addressing a switchover instruction to the user terminal only if the user agrees.

The user may therefore refuse to access the broadcast service proposed on the frequency block of the second type.

The switchover means of this device may also be responsible, in the case of detection on the frequency block of the second type of an item of signaling information signaling an incoming communication on the user terminal, for proposing that the user receive the incoming communication and, if the user agrees, for instructing the user terminal to switch over to the frequency block of the first type, so that it can make a request to set up a connection in order to initiate the incoming communication on the frequency block of the first type.

Furthermore, the switchover means may also be responsible, in the case of an attempt to set up an outgoing communication by the user terminal, for instructing the user terminal to switch over to the frequency block of the first type, so that the user terminal may make a request to set up a connection in order to initiate the outgoing communication on the frequency block of the first type.

Therefore, the use of the frequency block of the second type is compatible with the possibility for a user terminal to receive a communication or send on a frequency block of the first type.

The invention also proposes a user terminal comprising a frequency duplex transceiver capable of being connected to a network of the aforementioned type and comprising a control device according to the invention.

The invention also proposes a base station controller for a network of the aforementioned type comprising management means arranged to generate items of signaling information signaling the provision of a service on a frequency block of the second type so that the items of information are transmitted in signaling messages on a frequency block of the first type.

The invention also proposes a base station for a network of the aforementioned type arranged to transmit data frames of the first type either on a frequency block of the first type, or on a frequency block of the second type, depending on the instructions originating from a base station controller.

Finally, the invention proposes a method for controlling frequency bands used by user terminals capable of being connected to a network of the aforementioned type consisting in analyzing at least one item of signaling information received by the user terminal on a frequency block of the first type, and in instructing the user terminal to switch over to a frequency block of the second type in the case of detection of an item of signaling information signaling the provision of a service on the frequency block of the second type, in order to receive data frames of the first type on the frequency block of the second type.

Therefore, the user terminal may receive multimedia data associated with the service (if necessary broadcast service) and signaling information, transmitted via the radio access network in the form of FDD frames on the frequency block of the second type.

The method according to the invention may comprise other features which may be taken separately or in combination, and notably:

before instructing the switchover to the frequency block of the second type, it is proposed to the user of the user terminal to access the service provided on the frequency block of the second type, and the user terminal does not switch over unless there is agreement from its user.

in the case of detection of the frequency block of the second type of an item of signaling information signaling an incoming communication on the user terminal, it is proposed to the user to receive the incoming communication, and in the event of the user's agreement, the user terminal switches over to the frequency block of the first type, in order to be able to make a request to set up a connection in order to initiate the incoming communication on the frequency block of the first type, in the event of an attempt to set up an outgoing communication by the user terminal on an uplink, the user terminal switches over to the frequency block of the first type, in order to be able to make a request to set up a connection in order to initiate the outgoing communication on the frequency block of the first type, the network transmits to several user terminals, on a frequency block of the first type, signaling messages containing items of signaling information signaling the provision of a service on a frequency block of the second type, then the network transmits to the user terminals on the frequency block of the second type the data frames containing the data of the service and signaling information.

The invention is particularly suitable, although not exclusively, to broadcast services of the MBMS type.

BRIEF DESCRIPTION OF THE DRAWINGS

Other features and advantages of the invention will appear on examining the following detailed description and the appended drawings in which.

DESCRIPTION OF THE PREFERRED EMBODIMENTS

The appended drawings may be used not only to supplement the invention, but also may contribute to its definition if appropriate.

In the exemplary embodiment described below, the invention makes it possible to transmit data frames of the FDD type, comprising multimedia data associated with a service (possibly a broadcast service), from a radio access network operating in FDD mode belonging to a UMTS mobile network, to user terminals fitted with an FDD UMTS transceiver, in available frequency bands other than those of the FDD type, such as for example at least a portion of the frequency bands of the TDD type or other bands such as the MSS ("Mobile Satellite Service") satellite frequency bands or the frequency bands allocated to the GSM.

In the following, it is considered, as a nonlimiting example, that the cells form part of a radio access network of the FDD UTRAN type of a communication network of the UMTS ("Universal Mobile Telecommunications System") type offering multimedia content broadcast services of the MBMS type (hereinafter called MBMS services).

But the invention is not limited to this type of radio access network. Specifically it relates to any radio access network of the FDD UTRAN type or forming an upgrade of the UTRAN, and the satellite or hybrid (terrestrial and satellite) radio access networks. Furthermore, the invention is not limited solely to broadcast services of the MBMS type. It relates generally to all the services, which may be broadcast services, multimedia or not, called services "with no backward channel" because they do not require any acknowledgement. In addition, the invention is not limited solely to UMTS networks.

Furthermore, it is considered in the following that the non-FDD frequency band that is used for broadcasting multimedia data is the TDD frequency band. But the invention is not limited to this TDD frequency band. Specifically, it relates to any frequency band (paired or not) offering frequency blocks of 5 MHz that can be used in the UMTS context (in the example described).

It is important to note that the broadcast services (in this instance of the MBMS type) may vary from one cell to another or from one group of cells to another. Specifically, two broadcast services may be delivered in two service zones composed of common or different cells.

Figure 1:
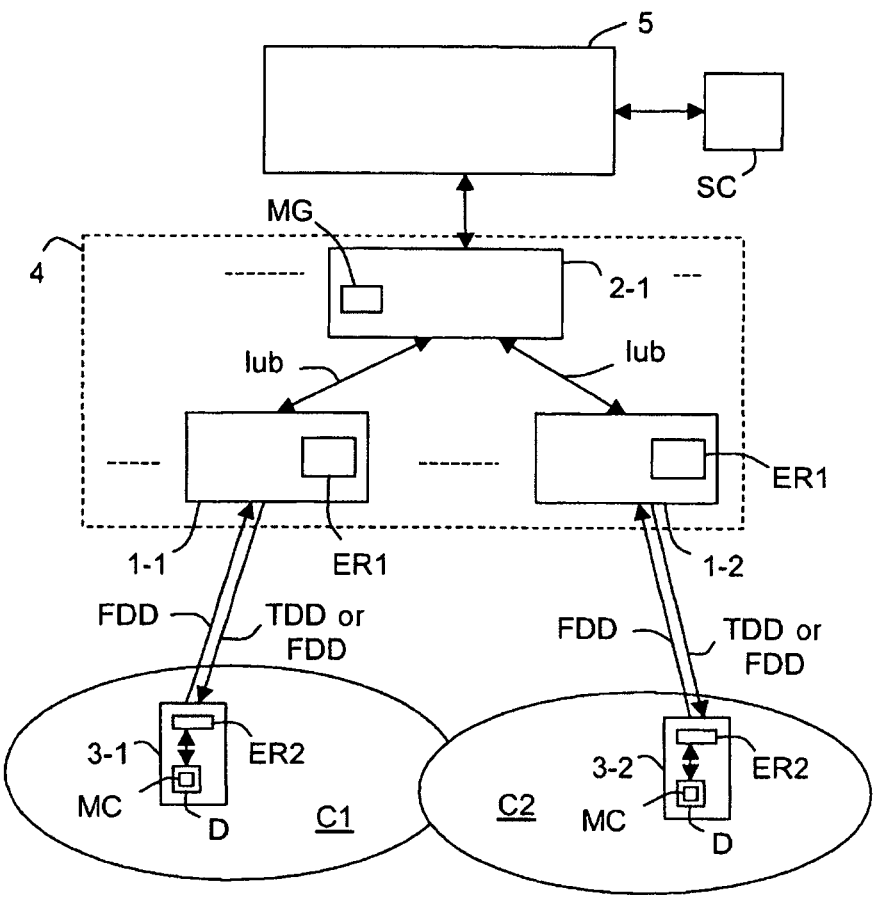
FIG. 1 illustrates very schematically and functionally the general architecture of a mobile communication network, comprising a radio access network furnished with a base station controller according to the invention and base stations according to the invention, and to which user terminals each fitted with a device according to the invention are connected.

Reference is made first of all to FIG. 1 in order to describe, very schematically, but nevertheless sufficiently for the understanding of the invention, an exemplary mobile (communication) network of the UMTS type in which the invention can be applied.

The mobile network comprises a radio access network 4 (or UTRAN) of the FDD type connected to a core network 5. The radio access network 4 comprises base stations 1-$i$, called "node B" in the case of the UMTS, and base station controllers 2-$k$, called "RNC" ("radio network controller") in the case of the UMTS.

In the nonlimiting example illustrated in FIG. 1, only two base stations 1-1 and 1-2 ($i$=1 or 2) and a base station controller 2-$k$ ($k$=1) have been represented. But the indices i and k may take any value greater than or equal to one (1).

The base stations 1-$i$ are mainly transceivers each associated with at least one coverage zone (consisting of a cell Ci or a group of cells) in which radio communications may be established with user terminals 3-$j$ which are situated therein. Consequently, each one comprises at least one transceiver module ER1 of the FDD type. The base station controllers 2-$k$ are responsible for controlling the radio access network and the actions carried out by the various user terminals 3-$j$.

The user terminals 3-$j$ (or UE, for "User Equipment") are mobile terminals. In the nonlimiting example illustrated in FIG. 1, only two user terminals 3-1 and 3-2 ($j$=1 or 2) have been represented. But the index j may take any value greater than or equal to one (1).

The user terminals 3-$j$ are communication terminals capable of interchanging, by means of waves with the radio access network 4, data frames of the FDD type, thanks to a transceiver ER2 of the FDD type. They are, for example, mobile terminals such as mobile telephones. But they could be communication terminals of other types, such as for example laptop computers fitted with a transceiver ER2 (in practice, they may be UMTS PCM/CIA cards) or personal digital assistants (PDAs) fitted with a transceiver ER2. In the following, it is considered, as an illustrative and nonlimiting example, that the user terminals 3-$j$ are mobile telephones.

The invention notably proposes to implement a control device D in at least certain of the user terminals 3-$j$ (in this instance mobile telephones) in order to control the use of the FDD frequency bands and of frequency blocks of a type different from FDD (in this instance those of the TDD type as an example).

Note that the FDD and TDD frequency bands are subdivided into frequency blocks of 5 MHz. In the following, it is considered that the FDD frequency blocks dedicated to the FDD uplinks form a first set of a first type, the FDD frequency blocks dedicated to the FDD downlinks form a second set of a first type, and the TDD frequency blocks dedicated to the TDD uplinks and downlinks form a third set of a second type.

It will be noted that several sets or portions of sets of frequencies of the non-FDD type may be used.

A control device D, according to the invention, comprises an analysis module and a switchover module. In the nonlimiting example illustrated in FIG. 1, the analysis module and the switchover module form two sub-portions of one and the same module referenced MC (they are therefore hereinafter both referenced MC). But they could be two separate modules.

The analysis module MC is activated and therefore made responsible to intervene, every time the mobile telephone 3-j in which it is implemented has set up with the radio access network 4 a communication (that is to say a circuit mode call or a packet mode session). In this instance, a "communication" means having set up, between the mobile telephone 3-j and the radio access network 4, on the one hand, an uplink on an FDD frequency block of the first set (and therefore of a first type), and on the other hand, a downlink on an FDD frequency block of the second set (and therefore of the first type).

Every time such a communication is set up, the analysis module analyzes at least certain of the signaling messages which are received by the mobile telephone 3-j to which it belongs, on the downlink that has been set up. It should be remembered that the signaling messages comprise, amongst other things, signaling information from the radio access network called "controller information" and/or "paging" information, and/or information relating to the broadcasting of a content specific to a service (for example MBMS). This analysis is intended to detect the presence of items of signaling information signaling the provision by the radio access network 4 of a broadcast service on a given TDD frequency block.

Specifically, according to the invention, the base station controllers 2-k are fitted with a management module MG responsible for generating, depending on the instructions supplied by the core network 5 and/or a management and maintenance center of the OMC ("Operation and Maintenance Center") type, forming part of a network management system or NMS of the UMTS mobile network, items of signaling information signaling the provision of a broadcast service on a given TDD frequency block of the third set. These items of information are then incorporated by the base station controller 2-k concerned into signaling messages in order to be transmitted to mobile telephones 3-j in point-to-multipoint mode and on a given FDD frequency block of the second set.

When the broadcast service is of the MBMS type, the signaling messages, which comprise the information relating thereto, are transmitted to the mobile telephones 3-j by the base stations 1-i on the Broadcast CHannel called BCH, just like the controller items of information (amongst others). Remember that this channel BCH carries a logic channel called BCCH ("Broadcast Control CHannel") which provides the mobile telephones 3-j with the information for accessing a transport channel called MCCH ("MBS Control CHannel") specific to the MBMS service, as specified in version 6 of the MBMS standard.

Note that the items of signaling information relating to a broadcast service include notably configuration information designed to allow the mobile telephones 3-j to configure themselves so as to be capable of monitoring a traffic channel on which the data of the content that said service broadcasts are transmitted. According to version 6 of the UMTS standard, in point-to-multipoint mode, the multimedia data associated with the MBMS service are broadcast on a transport channel called MTCH ("MBMS Traffic CHannel"). The configuration of the MTCH channel is known to the mobile telephone 3-j thanks to the information contained in the transport channel MCCH.

Amongst this configuration information, it is possible notably to cite the list of service zones for which each service (MBMS) or group of services (MBMS) must be broadcast, the programming of each service (MBMS) or group of services (MBMS), the quality of service (QoS) required for each service (MBMS) or group of services (MBMS), and the configuration of the traffic channel (MTCH) used by the service (MBMS).

For the analysis module of a mobile telephone 3-j to be able to detect information concerning a broadcast service, it is therefore necessary for it to observe the signaling messages that are transmitted in the downlink channel BCH on a given FDD frequency block of the second set. Preferably, the analysis module MC also observes the messages that are transmitted by the radio access network 4 in the downlink transport channel of the PCH ("Paging CHannel") type when the mobile telephone 3-j receives, for example, an incoming call.

Once the mobile telephones 3-j have been notified (on the BCH channel) of the provision of a broadcast service on a given TDD frequency block, the base station controller 2-k may proceed with the broadcast of the multimedia data, in the form of data frames of the FDD type, in the TDD frequency band.

It is important to note that the broadcast of multimedia data of the MBMS type is carried out either in point-to-point mode, or in point-to-multipoint mode. The point-to-point mode is usually used when the number of mobile telephones 3-j (due to receive a content to be broadcast) is small. In this case, dedicated radio channels of the point-to-point (or PTP) type are set up between the radio access network 4 and each mobile telephone 3-j that is to receive the content to be broadcast. Each dedicated radio channel is transmitted on an FDD frequency of a block of the second set (signaled in a signaling message). The point-to-multipoint mode is usually used when the number of mobile telephones 3-j (due to receive a content to be broadcast) is high. In this case, a shared MBMS radio channel of the point-to-multipoint (or PTM) type is set up between the radio access channel 4 and all the mobile telephones 3-j due to receive the content to be broadcast. This shared MBMS radio channel is transmitted on a TDD frequency of the given TDD frequency block of the third set (signaled in a signaling message).

In order to allow the transmission of the MBMS service data frames, the transceiver modules ER1 of the base stations 1-i (of the radio access network 4) must be adapted so as to be able to use, on the downlinks, not only the frequencies of the usual FDD frequency blocks of the second set, but also the frequencies of at least certain of the TDD frequency blocks of the third set. Each base station 1-i then tunes the transmission of its transceiver module ER1 either to FDD frequencies, or to TDD frequencies, depending on instructions provided by the base station controller 2-k which controls it.

When an analysis module MC of a mobile telephone 3-j detects items of signaling information signaling the provision of a broadcast service on a given TDD frequency block (and therefore of a second type), it activates the switchover module MC. The latter may then for example propose to the user to access this broadcast service, for example by instructing the display of a dedicated message on the screen of his mobile telephone 3-j. If the user signals that he is in agreement, the switchover module MC instructs the mobile telephone 3-j, to which it belongs, to switch over the downlink to the given TDD frequency block. The mobile telephone 3-j then replaces the former tuning of its transceiver ER2 (on an FDD frequency of the second set) with a new tuning on a TDD frequency of the given TDD frequency block. The mobile telephone 3-*j* may then receive the data of the broadcast service and signaling information transmitted by the radio access network 4 in the form of FDD frames in point-to-multipoint mode on the new tuning frequency of the given TDD frequency block.

It will be noted that, if the analysis module MC of a mobile telephone 3-*j* detects items of signaling information signaling the provision of a broadcast service in point-to-point mode on a dedicated radio channel and on a given FDD frequency block, it also activates the switchover module MC. The latter may then for example propose to the user to access this broadcast service, for example by instructing the display of a dedicated message on the screen of his mobile telephone 3-*j*. If the user signals that he is in agreement, the switchover module MC instructs his mobile telephone 3-*j* to switch over the downlink to the given FDD frequency block. The mobile telephone 3-*j* then replaces the former tuning of its transceiver ER2 (to an FDD frequency of the second set) with a new tuning on an FDD frequency of the given FDD frequency block (of this same second set). The mobile telephone 3-*j* may then receive the data of the broadcast service and signaling information transmitted by the radio access network 4 in the form of FDD frames in point-to-point mode on the new tuning frequency of the given FDD frequency block. The case described above corresponds to what is called "Frequency Layer Convergence" in version 6 of the UMTS standard. More precisely, it consists in receiving the MBMS content on an FDD frequency dedicated to the broadcast. This frequency uses dedicated cells. When an MBMS service is available, two situations are to be envisaged: either there are few users to be made to converge on this dedicated frequency (and the associated cells) and the service is delivered in PTP mode, or there are many users to be made to converge on this dedicated frequency (and the associated cells) and the service is delivered in PTM mode.

In the case of an MBMS service, the multimedia data associated with the broadcast service form a multimedia content, such as for example a text, image, audio or video (particularly television programs) data file, or else any combination of the aforementioned contents as examples. These content data are provided by a content server SC which is connected to the core network 5, and more precisely to a GGSN ("Gateway GPRS Support Node") node that it comprises. In version 6 of the UMTS standard, and in the context of the MBMS, the content server is called the BM-SC ("Broadcast/Multicast Service Center").

It should be remembered that the core network 5 comprises at least one SGSN node ("Serving GPRS Support Node") connected in particular to base station controllers 2-*k*, and at least one GGSN node connected to the SGSN node and providing the connection from the core network 5 to at least one content server SC offering content broadcast services, for example of the MBMS type.

Note that the content data may if necessary be compressed either by the content server SC, or by the base station controller 2-*k*.

The analysis module MC of a device D may also intervene when it detects the arrival in the mobile telephone 3-*j* to which it belongs, on the given TDD frequency block, items of signaling information signaling an incoming call, like for example an incoming call (or a message of the SMS, MMS or other type). Note that the incoming calls are signaled by messages called "paging messages" that are transmitted on a transport channel called PCH ("Paging CHannel"). So that the analysis module MC of a mobile telephone 3-*j* can detect paging messages, it must observe the downlink channel PCH on the given TDD frequency block of the third set. If an incoming call is detected, the analysis module MC activates the switchover module MC. The latter may then for example propose that the user of the mobile telephone 3-*j* receive this incoming call, for example by instructing the display of a dedicated message on the screen of his mobile telephone 3-*j*. If the user indicates that he agrees, the switch over module MC instructs the mobile telephone 3-*j* to switch over the downlink to the given FDD frequency block of the second set (used before the switchover to the given TDD frequency block in order to receive the content data of the MBMS service), in order to receive the incoming communication, for example the incoming call.

The mobile telephone 3-*j* then replaces the former tuning of its transceiver ER2 (on a TDD frequency of the third set) with a new tuning on an FDD frequency of the given FDD frequency block (of the second set). The mobile telephone 3-*j* may then make, to the radio access network 4, a request to set up a connection in order to receive the incoming call on the FDD frequency block of the second set. This request is made on an uplink transport channel called RACH ("Random Access CHannel"). The mobile telephone 3-*j* may then receive the conventional packet or circuit service data (such as those of a telephone call), but it is no longer capable of receiving the content data broadcast on the TDD frequency block.

Furthermore, the analysis module MC of a device D may also intervene when its mobile telephone 3-*j* wishes to initiate, at the request of the user of said mobile telephone, an outgoing communication, such as for example an outgoing call or the sending of an SMS or the opening of an Internet session, on the uplink on the FDD frequency block of the first set. In this case, the analysis module MC activates the switchover module MC. The latter then instructs the mobile telephone 3-*j* to which it belongs to switch over the downlink to the given FDD frequency block of the second set, so that the radio access network 4 may make a request to set up a connection in order to initiate (then receive) the outgoing communication on the given FDD frequency block of the second set (used before the switchover to the given TDD frequency block in order to receive the content data of the MBMS service). Specifically, this procedure is made necessary because the telephone communication, having been the subject of the outgoing communication and requiring an uplink backward channel, must necessarily be carried out on the FDD frequencies because they offer both the uplink and downlink channels while the TDD frequency block offers only a downlink channel. The mobile telephone 3-*j* makes its request to set up a connection on the transport channel RACH. The mobile telephone 3-*j*, once the connection has been set up, may then transmit and receive the conventional packet or circuit service data (such as those of a telephone call), but it is no longer capable of receiving the content data broadcast on the TDD frequency.

Figure 2:
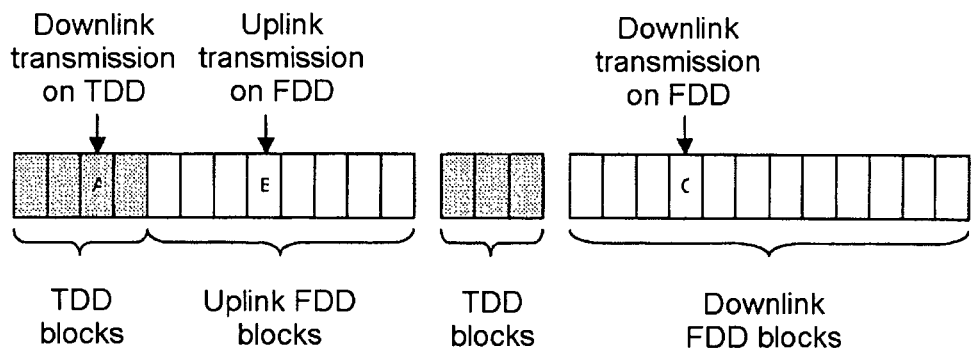
FIG. 2 illustrates schematically an example of use of TDD and FDD frequency bands according to the invention.

There now follows a description of an example of control, according to the invention, of the FDD (first type) frequencies and TDD (second type in this example) frequencies used by a mobile telephone 3-*j*, in the form of steps of a method and with reference to FIG. 2.

The method begins when a mobile telephone 3-*j* (of the FDD type) sets up a UMTS connection on the FDD frequency bands (with its FDD transceiver ER2). The connection is set up with an uplink to the radio access network 4, for example on the FDD frequency block referenced B of the first set, and a downlink to the mobile telephone 3-*j*, for example on the FDD frequency block referenced C of the second set.

When a broadcast service with no backward channel (for example MBMS) is available, it is available in the TDD frequency band, for example on the TDD frequency block referenced A of the third set. The radio access network 4 then uses the FDD frequency block C to notify the mobile telephone 3-$j$ to switch over, if its user wishes, to the TDD frequency block A in order to receive the MBMS service.

The FDD mobile terminal therefore switches from the FDD frequency block C to the TDD frequency block A in order to receive the MBMS service in point-to-multipoint mode, broadcast by the radio access network 4 in the form of downlink FDD frames on the TDD frequency band (with no associated uplink FDD frame).

The FDD transceiver ER2 of the mobile telephone 3-$j$ is naturally considered capable of reading the downlink FDD frame on the TDD frequency band. The mobile telephone 3-$j$ therefore no longer listens to the downlink FDD frequency band (the FDD frequency block C) but listens only to the TDD frequency band (the TDD frequency block A) in order to receive the MBMS service and the paging information.

If the mobile telephone 3-$j$ is to receive an incoming call, it is notified thereof by a paging message on the TDD frequency band (the TDD frequency block A). The mobile telephone 3-$j$ then transfers back to the FDD frequency band (the FDD frequency block C), if its user wishes to receive the incoming call, then it makes its request to set up a connection to receive the incoming call on the uplink FDD frequency band (the FDD frequency block B).

If the mobile telephone 3-$j$ makes an outgoing call while it is tuned to the TDD frequency band (the TDD frequency block A), it switches back to the FDD frequency band (the FDD frequency block C) in order to allow the mobile telephone 3-$j$ to make its request to set up a connection. Note that in the case of an incoming call, the corresponding paging message is sent from the radio access network 4 to the mobile telephone 3-$j$, and that subsequently the mobile telephone 3-$j$ initiates its connection request. In the case of an outgoing call, the mobile telephone 3-$j$ directly initiates the connection request.

The control device D according to the invention, and particularly its analysis and switchover modules MC, and the management module MG of the base station controllers 2-$k$ may be produced in the form of software (or computer) modules, electronic circuits, or a combination of circuits and software.

The invention is not limited to the embodiments of a control device, user terminal (or mobile terminal), base station controller, base station and control method described above, only as an example, but it covers all the variants that those skilled in the art can envisage in the context of the following claims.

The invention claimed is:

1. A device for controlling frequency bands used by a user terminal comprising a Frequency Division Duplex (FDD) type transceiver and suitable for being connected to a network making it possible to provide the user with a broadcast and/or multicast service that does not require a backward channel, said network being a FDD network, and having at least one set of frequency blocks of a FDD type, dedicated to the transmission of data frames, and one set of frequency blocks of a non-FDD type distinct from said FDD type, said device comprising:
    i) means for analyzing at least one item of signaling information received by said user terminal on a frequency block of the FDD type, said means for analyzing being adapted to detect whether the item of signaling information signals the provision of the service on a frequency block of the non-FDD type, and
    ii) switchover means capable of being activated if said analyzing means detect an item of signaling information signaling the provision of a service on a frequency block of the non-FDD type, in order to receive data frames of the FDD type on the frequency block of the non-FDD type,
    wherein said switchover means are arranged in order to:
    before the switchover to the frequency block of the non-FDD type, propose that the user of said user terminal access said service, and
    address a switchover instruction to said user terminal if its user agrees, and
    wherein said switchover means are further arranged in order to, in the event of an attempt to set up an outgoing communication by said user terminal or to receive an incoming communication while receiving the broadcasting service on a frequency block of the non-FDD type, instruct said user terminal to switch over to said frequency block of the FDD type, so that said user terminal can make a request to set up a connection in order to initiate said outgoing communication on said frequency block of the FDD type.

2. The device as claimed in claim 1, characterized in that said switchover means are arranged in order to:
    in the event of detection, on said frequency block of the non-FDD type, of an item of signaling information signaling an incoming communication on said user terminal, propose that said user receive said incoming communication and,
    in the event of said user's agreement, instruct said user terminal to switch over to said frequency block of the FDD type, so that it can make a request to set up a connection in order to initiate said incoming communication on said frequency block of the FDD type.

3. A user terminal, comprising a Frequency Division Duplex (FDD) type transceiver suitable for connecting to a network making it possible to provide the user with a service not requiring a backward channel, said network being a FDD network, and having at least one set of frequency blocks of a FDD type dedicated to the transmission of data frames, and one set of frequency blocks of a non-FDD type distinct from said FDD type, characterized in that it comprises a control device as claimed in claim 1.

4. A method of controlling frequency bands used by user terminals comprising a Frequency Division Duplex (FDD) type transceiver and suitable for being connected to a network making it possible to provide the user with a broadcast and/or multicast service not requiring a backward channel, said network being a FDD network, and having at least one set of frequency blocks of a FDD type dedicated to the transmission of data frames, and one set of frequency blocks of a non-FDD type distinct from said FDD type, said method consisting in:
    i) analyzing at least one item of signaling information received by said user terminal on a frequency block of the FDD type, and detecting whether the item of signaling information signals the provision of the service on a frequency block of the non-FDD type, in the event of an attempt to set up an outgoing communication by said user terminal or to receive an incoming communication while receiving a service on a frequency block of the non-FDD type, recommending user of said user terminal to switch over to said frequency block of the FDD type, so that said user terminal can make a request to set up a connection in order to initiate said outgoing communication on said frequency block of the FDD type, ii) proposing to the user of said user terminal to access the service provided on said frequency block of the non-FDD type, wherein said user terminal does not switch over unless its user agrees, and iii) instructing said user terminal to switch over to a frequency block of the non-FDD type in the case of detection of an item of signaling information signaling the provision of a service on said frequency block of the non-FDD type, in order to receive data frames of the FDD type on the frequency block of the non-FDD type.

5. The method as claimed in claim 4, wherein, in the event of detection on said frequency block of the non-FDD type of an item of signaling information signaling an incoming communication on said user terminal, it is proposed to said user to receive said incoming communication, and in the event of agreement of said user, said user terminal switches over to said frequency block of the FDD type, in order to be able to make a request to set up a connection in order to initiate said incoming communication on said frequency block of the FDD type.

6. The method as claimed in claim 4, wherein, in the event of an attempt to set up an outgoing communication by said user terminal on an uplink, said user terminal switches over to said frequency block of the FDD type, in order to be able to make a request to set up a connection in order to initiate said outgoing communication on said frequency block of the FDD type.

7. The method as claimed in claim 4, wherein said network transmits to several user terminals, on a frequency block of the FDD type, signaling messages containing items of signaling information signaling the provision of a service on a frequency block of the non-FDD type, and then said network transmits to said user terminals on said frequency block of the non-FDD type the data frames containing the data of said service and items of signaling information.

8. The method as claimed in one of claims 4, 5, 6, or 7, wherein the service is a broadcast service of the Multimedia Broadcast/Multicast Service (MBMS) type.

* * * * *